US012718768B2

(12) United States Patent
Lee

(10) Patent No.: US 12,718,768 B2
(45) Date of Patent: Aug. 25, 2026

(54) GATE DRIVER AND DISPLAY DEVICE INCLUDING THE SAME

(71) Applicant: LG Display Co., Ltd., Seoul (KR)

(72) Inventor: Tae Gwan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 3 days.

(21) Appl. No.: 18/928,701

(22) Filed: Oct. 28, 2024

(65) Prior Publication Data

US 2025/0225938 A1 Jul. 10, 2025

(30) Foreign Application Priority Data

Jan. 9, 2024 (KR) ........................ 10-2024-0003435

(51) Int. Cl.
*G09G 3/3266* (2016.01)

(52) U.S. Cl.
CPC ... *G09G 3/3266* (2013.01); *G09G 2310/0286* (2013.01); *G09G 2310/08* (2013.01); *G09G 2340/0435* (2013.01)

(58) Field of Classification Search
CPC .. G09G 5/00; G09G 5/10; G09G 5/12; G09G 5/18; G09G 3/00; G09G 3/20; G09G 3/32; G09G 3/34; G09G 3/36; G09G 3/3266; G09G 3/3233; G09G 3/3208; G09G 3/3258; G09G 3/3275; G09G 3/3291; G09G 3/3283; G09G 2310/08; G09G 2310/0286; G09G 2340/0435; G11C 19/28; H01L 27/12; H01L 27/32; H01L 29/04; H03K 19/0175
See application file for complete search history.

(56) References Cited

U.S. PATENT DOCUMENTS

2006/0290644 A1* 12/2006 Kim ..................... G09G 3/3677 345/100
2007/0262310 A1* 11/2007 Park ..................... G09G 3/3659 257/59

(Continued)

FOREIGN PATENT DOCUMENTS

KR 20070028001 A 3/2007

*Primary Examiner* — Chanh D Nguyen
*Assistant Examiner* — Nguyen H Truong
(74) *Attorney, Agent, or Firm* — Seed Intellectual Property Law Group LLP

(57) ABSTRACT

A gate driver includes a level shifter configured to output first-mode gate clocks in a normal scan rate mode and output second-mode gate clocks in a high scan rate mode and a gate shifter register configured to output normal scan rate scan signals synchronized with the first-mode gate clocks in the normal scan rate mode and output high scan rate scan signals synchronized with the second-mode gate clocks in the high scan rate mode. Adjacent gate clocks of the first-mode gate clocks have a delay difference equal to one horizontal period, and the second-mode gate clocks include first to fourth gate clocks where a phase is sequentially shifted. The first and third gate clocks have a delay difference equal to the one horizontal period, the first and second gate clocks have a delay difference equal to a time which is less than the one horizontal period, and the third and fourth gate clocks have a delay difference equal to a time which is less than the one horizontal period.

15 Claims, 18 Drawing Sheets

(56) References Cited

U.S. PATENT DOCUMENTS

| | | | | |
|---|---|---|---|---|
| 2008/0224984 | A1* | 9/2008 | Chang | G09G 3/3614 345/100 |
| 2011/0157132 | A1* | 6/2011 | Byun | G09G 3/3677 345/211 |
| 2022/0208105 | A1* | 6/2022 | Lee | G09G 3/3266 |
| 2023/0401987 | A1* | 12/2023 | Su | G09G 3/20 |
| 2024/0105091 | A1* | 3/2024 | Liu | G09G 3/3266 |
| 2024/0290243 | A1* | 8/2024 | Li | G09G 3/2092 |
| 2024/0321230 | A1* | 9/2024 | Ma | G09G 3/36 |

* cited by examiner

[ MODE1]

[ MODE2]

GATE DRIVER AND DISPLAY DEVICE INCLUDING THE SAME

CROSS-REFERENCE TO RELATED APPLICATIONS

This application claims the benefit of the Korean Patent Application No. 10-2024-0003435 filed on Jan. 9, 2024, which is hereby incorporated by reference as if fully set forth herein.

BACKGROUND

Technical Field

The present disclosure relates to a gate driver and a display device including the same.

Description of the Related Art

Display device include a gate driver for driving gate lines of a display panel.

Recently, a gate driver is designed to selectively implement a normal scan rate mode and a high scan rate mode. The gate driver may supply gate lines with a scan signal shifted by units of one line so as to implement a normal scan rate and may supply the gate lines with a scan signal shifted by units of two lines so as to implement a high scan rate.

In the high scan rate mode, a scan signal pair having the same phase are supplied to two gate lines disposed adjacent to each other. That is, gate lines paired two-by-two are sequentially scanned by scan signal pairs where a phase is sequentially shifted. Comparing with the normal scan rate mode, in the high scan rate mode, one frame time decreases by half.

In the high scan rate mode, the gate driver outputs a scan signal pair having the same phase, based on a gate clock pair having the same phase. A magnitude of ripple occurring in a control node of the gate driver may increase in synchronization with rising edges or falling edges of a gate clock pair having the same phase. In the high scan rate mode, a magnitude of ripple occurring in the control node of the gate driver increases by about two times compared to the normal scan rate mode.

BRIEF SUMMARY

The present disclosure may provide a gate driver and a display device including the same, which may decrease a magnitude of ripple, occurring in a high scan rate mode, to a level corresponding to a normal scan rate mode.

To achieve these technical features and other characteristics and in accordance with the purpose of the disclosure, as embodied and broadly described herein, a gate driver includes a level shifter configured to output first-mode gate clocks in a normal scan rate mode and output second-mode gate clocks in a high scan rate mode having a scan rate greater than the normal scan rate mode and a gate shifter register configured to output normal scan rate scan signals synchronized with the first-mode gate clocks in the normal scan rate mode and output high scan rate scan signals synchronized with the second-mode gate clocks in the high scan rate mode. Adjacent gate clocks of the first-mode gate clocks have a delay difference equal to one horizontal period, and the second-mode gate clocks include first to fourth gate clocks where a phase is sequentially shifted. The first and third gate clocks have a delay difference equal to the one horizontal period, the first and second gate clocks have a delay difference equal to a time which is less than the one horizontal period, and the third and fourth gate clocks have a delay difference equal to a time which is less than the one horizontal period.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

A display device according to the present disclosure may be applied to televisions (TVs), video players, personal computers (PCs), home theaters, electronic devices for vehicles, and smartphones, but is not limited thereto. The display device according to the present disclosure may be implemented as a light emitting display device, a quantum dot display (QDD) device, or a liquid crystal display (LCD) device. Hereinafter, for convenience of description, a light emitting display device based on an inorganic light emitting diode or an organic light emitting diode will be described for example.

Moreover, an example where a light emitting display device described below includes an n-type or p-type transistor will be described, but the light emitting display device may be implemented as a type where an n-type transistor and a p-type transistor are provided in common. A transistor may be a three-electrode element including a gate, a source, and a drain. A source and a drain of a transistor may be switched based on an applied voltage. Based thereon, in the following description, an example will be described where one of a source and a drain is a first electrode, and the other of the source and the drain is a second electrode.

Figure 1:
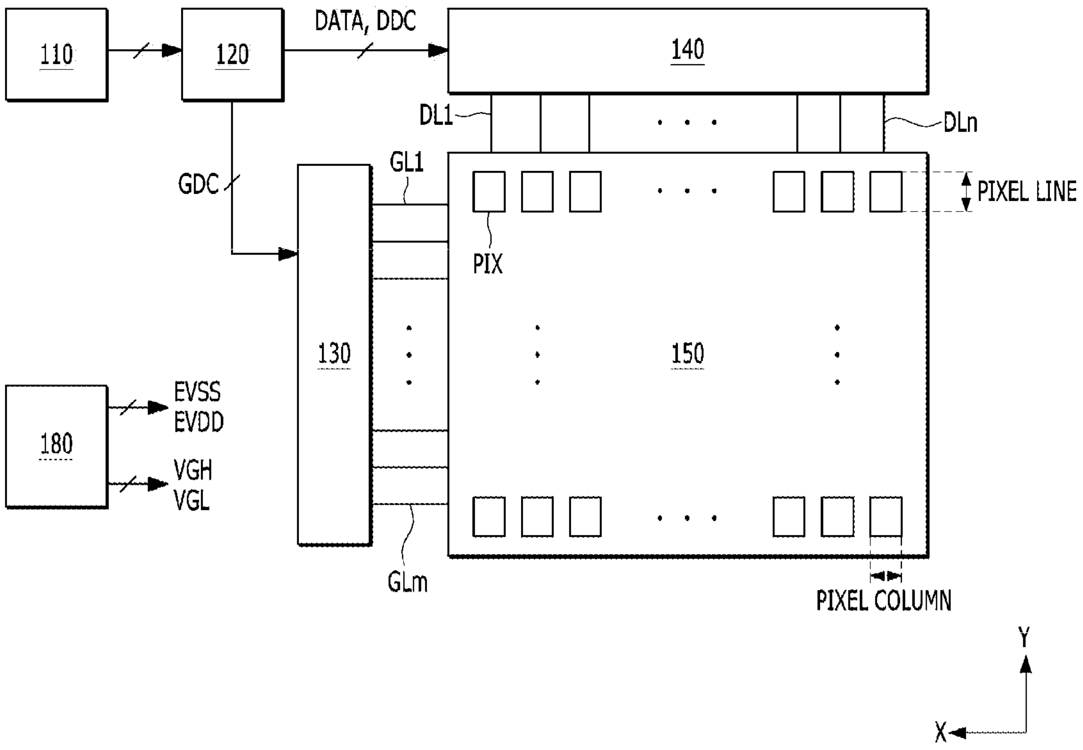
FIG. 1 is a diagram illustrating a display device according to the present embodiment.
Figure 2:
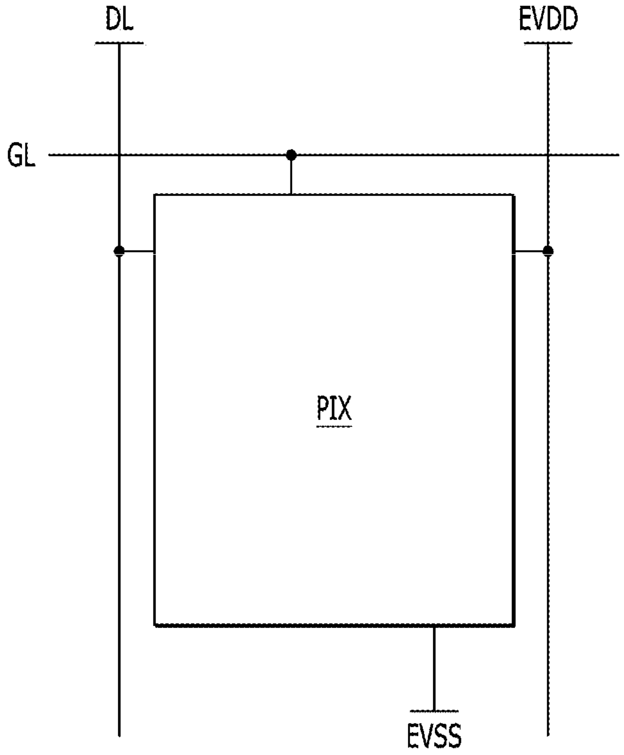
FIG. 2 is a diagram schematically illustrating a pixel illustrated in FIG. 1.

FIG. 1 is a diagram illustrating a display device according to the present embodiment. FIG. 2 is a diagram schematically illustrating a pixel illustrated in FIG. 1.

As illustrated in FIGS. 1 and 2, the display device according to the present embodiment may include a host system 110, a timing controller 120, a gate driver 130, a data driver 140, a display panel 150, and a power circuit 180. Based on an implementation type of a display device, one or more of the timing controller 120, the gate driver 130, and the data driver 140 may be integrated into a single integrated circuit (IC).

The host system 110 may supply the timing controller 120 with a synchronization timing signal along with video data. The host system 110 be one of a television (TV), a set-top box, a navigation system, a personal computer (PC), a home theater, an automotive display system, a mobile device, and a wearable device.

The timing controller 120 may output a gate timing control signal GDC for controlling an operation timing of the gate driver 130 and a data timing control signal DDC for controlling an operation timing of the data driver 140, based on the synchronization timing signal. The timing controller 120 may supply the data driver 140 with image data DATA along with the data timing control signal DDC. The timing controller 120 may be formed as an IC type and may be mounted on a printed circuit board (PCB), but is not limited thereto.

The gate driver 130 may output a scan signal, based on the gate timing control signal GDC supplied from the timing controller 120. The gate driver 130 may supply the scan signal to pixels PIX of the display panel 150 through a plurality of gate lines GL1 to GLm. The gate driver 130 may be formed as an IC type, or may be directly formed as a gate in panel (GIP) type on the display panel 150, but is not limited thereto.

The data driver 140 may sample and latch the image data DATA, based on the data timing control signal DDC supplied from the timing controller 120, and may map latched data to a gamma compensation voltage to generate analog data voltages. The data driver 140 may supply the data voltages to the pixels PIX of the display panel 150 through a plurality of data lines DL1 to DLn. The data driver 140 may be formed as an IC type and may be bonded to or mounted on a PCB, but is not limited thereto.

The power circuit 180 may generate a high-level first panel power EVDD and a low-level second panel power EVSS, based on a direct current (DC) input voltage supplied from the outside. The power circuit 180 may further generate a gate high voltage VGH and a gate low voltage VGL each needed for driving of the gate driver 130 and a source voltage needed for driving of the data driver 140.

The display panel 150 may include a screen which displays an input image. The screen may be configured with a pixel array. The pixel array may include the plurality of data lines DL1 to DLn, the plurality of gate lines GL1 to GLm intersecting with the data lines DL1 to DLn, and a plurality of pixels PIX.

The pixels PIX may be arranged on the screen AA as a matrix type defined by the data lines DL1 to DLn and the gate lines GL1 to GLm. The pixels PIX may be arranged as various types, such as a stripe type and a diamond type as well as a matrix type, on the screen.

The pixel array may include a plurality of pixel columns and a plurality of pixel lines intersecting with the pixel columns. Each of the pixel columns may include pixels PIX which are arranged in a Y-axis direction. A pixel line may include pixels PIX which are arranged in an X-axis direction. One vertical period may be one frame time needed for writing image data DATA of one frame in all pixels PIX of the screen. One horizontal period may be a time obtained by dividing one frame period by the number of pixel lines L1 to Ln. One horizontal period may be a time needed for writing the image data DATA of one pixel line, sharing a gate line, in pixels PIX of one pixel line.

The pixels PIX may include a red (R) pixel, a green (G) pixel, a blue (B) pixel, and a white (W) pixel for color implementation. Each of the pixels PIX may include a pixel circuit which includes a light emitting device, a driving element, a switching element, and a capacitor. Each of the driving element and the switching element may be implemented as a thin film transistor (TFT). TFTs may be implemented as a P type, an N type, or a hybrid type where the P type and the N type are provided in common. Also, a semiconductor layer of each TFT may include amorphous silicon, polysilicon, or oxide.

Figure 3:
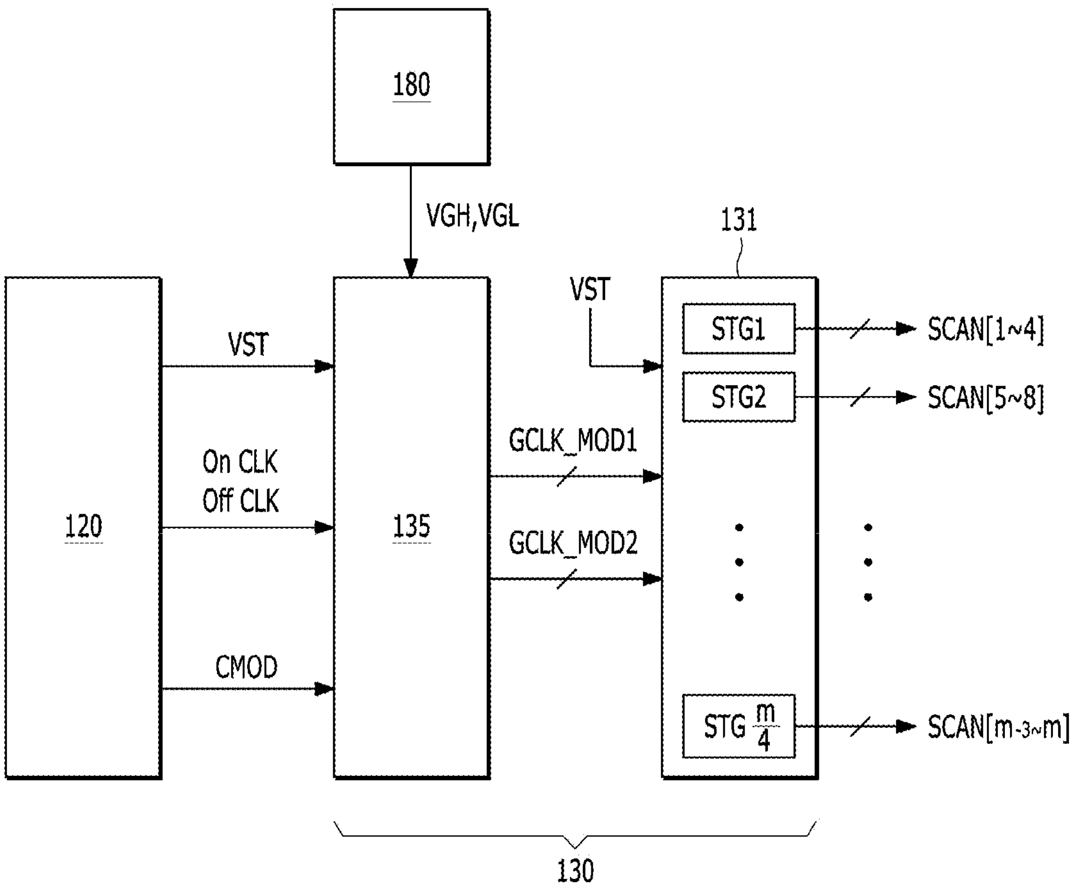
FIG. 3 is a diagram illustrating a connection configuration between a timing controller and a gate driver in a display device according to the present embodiment.
Figure 4:
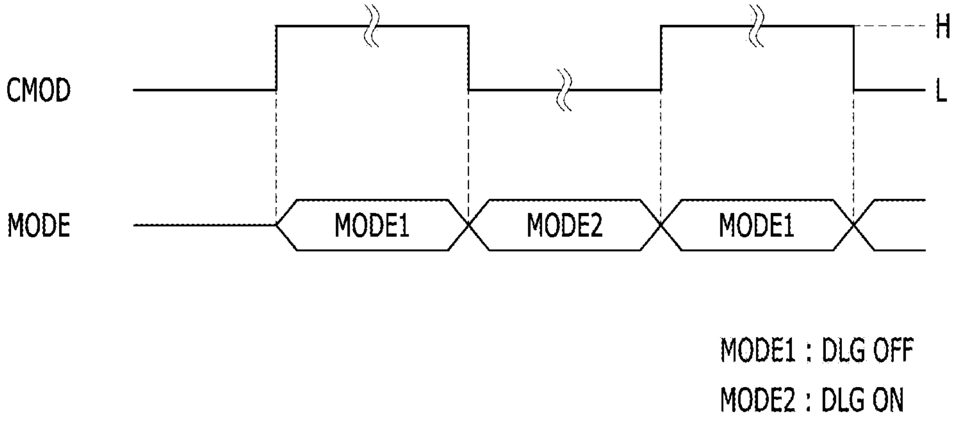
FIG. 4 is a diagram illustrating an example where a normal scan rate mode and a high scan rate mode are selectively executed based on a mode control signal.
Figure 5:
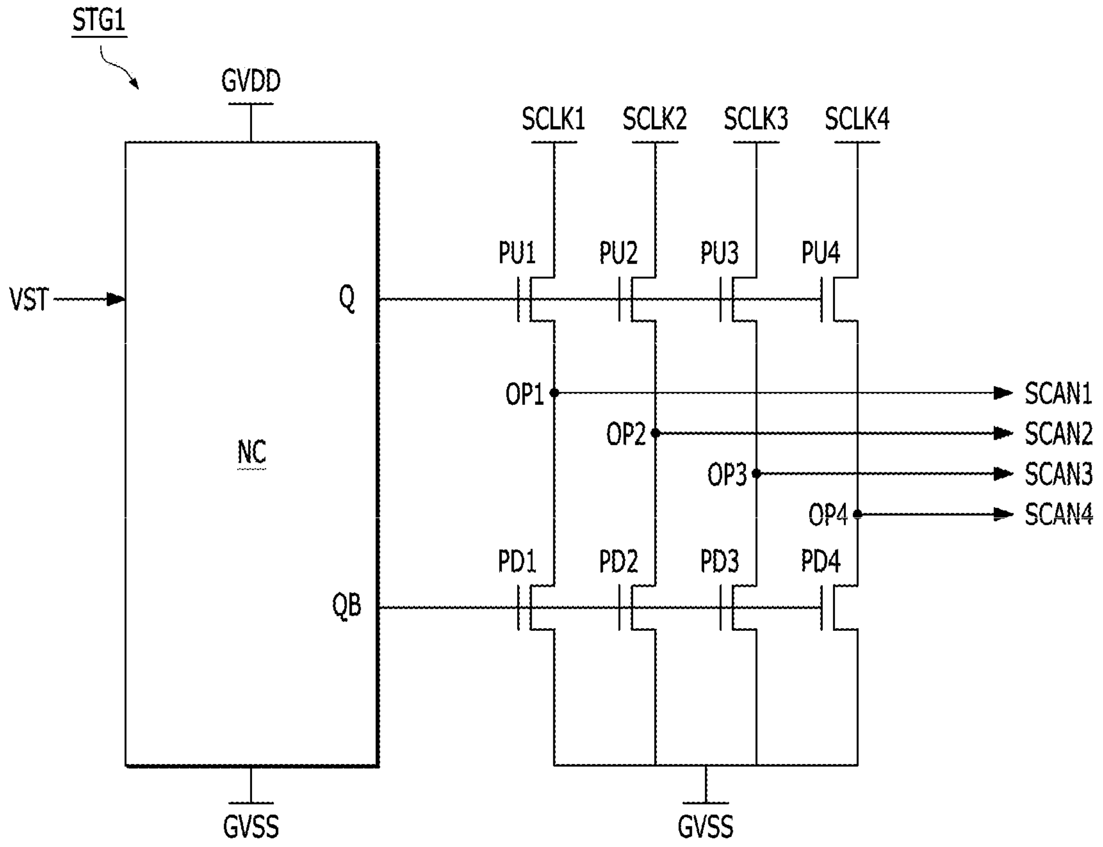
FIG. 5 is a diagram schematically illustrating one stage configuration included in a gate shift register.

FIG. 3 is a diagram illustrating a connection configuration between a timing controller and a gate driver in a display device according to the present embodiment. FIG. 4 is a diagram illustrating an example where a normal scan rate mode and a high scan rate mode are selectively executed based on a mode control signal. FIG. 5 is a diagram schematically illustrating one stage configuration included in a gate shift register.

Referring to FIG. 3, a gate driver 130 may include a level shifter 135 and a gate shift register 131.

The level shifter 135 may generate gate clocks GCLK, based on a gate timing control signal GDC (e.g., a start signal VST, an on clock (On CLK), and an off clock (Off CLK)) input from a timing controller 120 and a gate high voltage VGH and a gate low voltage VGL each input from a power circuit 180.

The level shifter 135, as illustrated in FIG. 4, may generate first-mode and second-mode gate clocks GCLK_MOD1 and GCLK_MOD2 for implementing a scan rate mode based on a mode control signal CMOD input from the timing controller 120 to output to the gate shift register 131.

The level shifter 135 may output the first-mode gate clocks GCLK_MOD1 to the gate shift register 131 in response to a mode control signal CMOD of a first logic voltage H. The first-mode gate clocks GCLK_MOD1 may be for implementing a normal scan rate mode MODE1. In the first-mode gate clocks GCLK_MOD1, adjacent gate clocks may have a delay difference equal to one horizontal period.

The level shifter 135 may output the second-mode gate clocks GCLK_MOD2 to the gate shift register 131 in response to a mode control signal CMOD of a second logic voltage L. The second-mode gate clocks GCLK_MOD2 may be for implementing a high scan rate mode MODE2. In the second-mode gate clocks GCLK_MOD2, some adjacent gate clocks may have a delay difference equal to one horizontal period, and the other adjacent gate clocks may have a delay difference equal to a certain time ΔT. Here, ΔT may be a time which is far shorter than one horizontal period.

The level shifter 135 may supply the first-mode gate clocks GCLK_MOD1 to the gate shift register 131 through a plurality of clock lines in the normal scan rate mode MODE1 and may supply the second-mode gate clocks GCLK_MOD2 to the gate shift register 131 through the clock lines in the high scan rate mode MODE2.

The level shifter 135 may further output the start signal VST to the gate shift register 131 through a start line, in the normal scan rate mode MODE1 and the high scan rate mode MODE2.

The gate shift register 131 may generate normal scan rate scan signals SCAN synchronized with the first-mode gate clocks GCLK_MOD1 to output to gate lines in the normal scan rate mode MODE1.

The gate shift register 131 may generate high scan rate scan signals SCAN synchronized with the second-mode gate clocks GCLK_MOD2 to output to the gate lines in the high scan rate mode MODE2.

The gate shift register 131 may include a plurality of gate stages STG1 to STG(m/4) dependently connected to one another. To decrease a circuit area occupied by the gate shift register 131, the gate shift register 131 may be designed so that m/4 number of gate stages drive m number of gate lines.

To this end, as in FIG. 5, a stage STG1 according to the present embodiment may include four output nodes OP1 to OP4 and may output four scan signals SCAN1 to SCAN4 through the output nodes OP1 to OP4.

The stage STG1 according to the present embodiment may include a first output circuit (including first pull-up transistor PU1 and first pull-down transistor PD1) connected to a first output node OP1, a second output circuit (including second pull-up transistor PU2 and second pull-down transistor PD2) connected to a second output node OP2, a third output circuit (including third pull-up transistor PU3 and third pull-down transistor PD3) connected to a third output node OP3, and a fourth output circuit (including fourth pull-up transistor PU4 and fourth pull-down transistor PD4) connected to a fourth output node OP4. The stage STG1 according to the present embodiment may include a node control circuit NC for controlling operations of the first to fourth output circuits. The start signal VST, a high-level driving voltage GVDD, and a low-level driving voltage GVSS may be supplied to the node control circuit NC.

The first to fourth output circuits may share or be connected to a same first control node Q and a same second control node QB of the node control circuit NC. While a voltage of the first control node Q is maintained at an active level, a voltage of the second control node QB may be maintained at an inactive level. Also, while the voltage of the first control node Q is maintained at an inactive level, the voltage of the second control node QB may be maintained at an active level.

Gate electrodes of first to fourth pull-up transistors PU1 to PU4 included in the first to fourth output circuits may be connected to the first control node Q in common. While the voltage of the first control node Q has an active level, first to fourth gate clocks SCLK1 to SCLK4 may be applied to the first to fourth output nodes OP1 to OP4 through the first to fourth pull-up transistors PU1 to PU4. Accordingly, the first to fourth scan signals SCAN1 to SCAN4 output from the first to fourth output nodes OP1 to OP4 may be synchronized with the first to fourth gate clocks SCLK1 to SCLK4.

The first to fourth gate clocks SCLK1 to SCLK4 may be the first-mode gate clocks GCLK_MOD1 in the normal scan rate mode MODE1 and may be the second-mode gate clocks GCLK_MOD2 in the high scan rate mode MODE2.

Gate electrodes of first to fourth pull-down transistors PD1 to PD4 included in the first to fourth output circuits may be connected to the second control node QB in common. While a voltage of the second control node QB has an active level, the low-level driving voltage GVSS may be applied to the first to fourth output nodes OP1 to OP4 through the first to fourth pull-down transistors PD1 to PD4.

Figure 6:
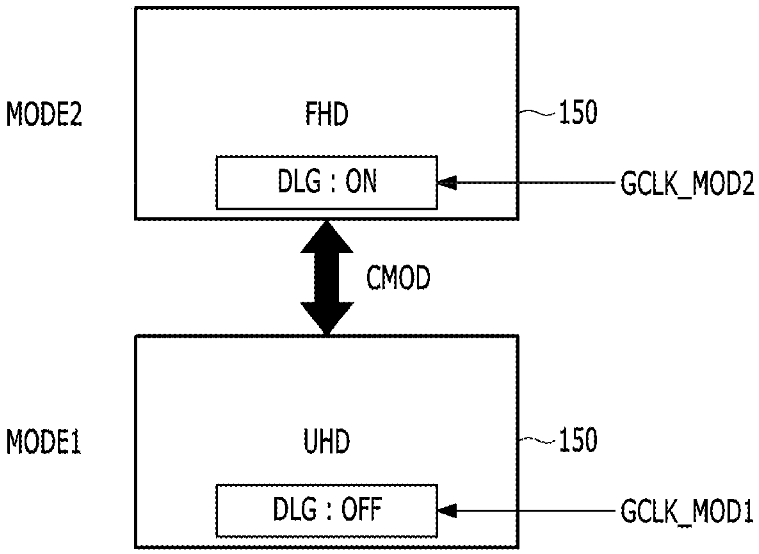
FIG. 6 is a diagram illustrating an example where a screen having a first resolution is implemented in a normal scan rate mode and a screen having a second resolution is implemented in a high scan rate mode.
Figure 7:
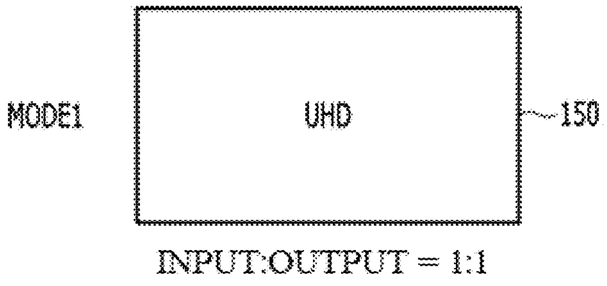
FIGS. 7 to 10 are diagrams for describing an operation of a panel driver for implementing a screen having a first resolution in a normal scan rate mode.
Figure 8:
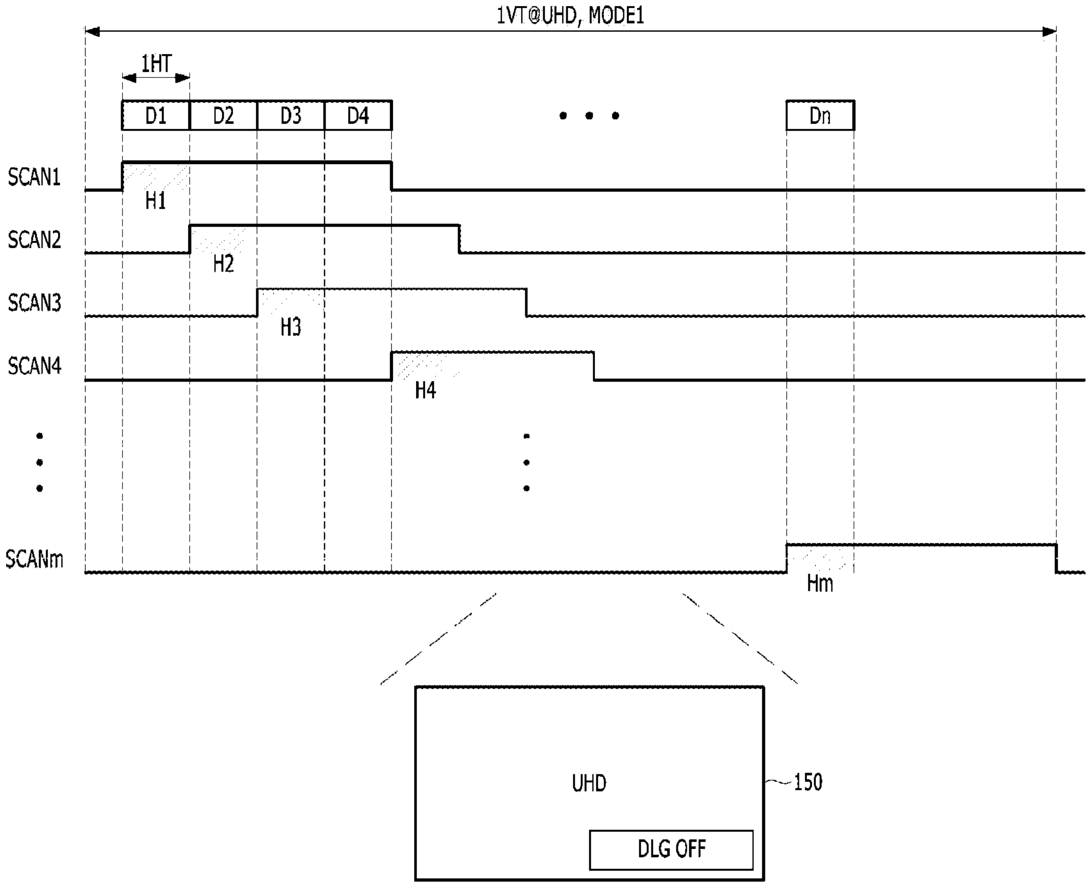
Figure 9:
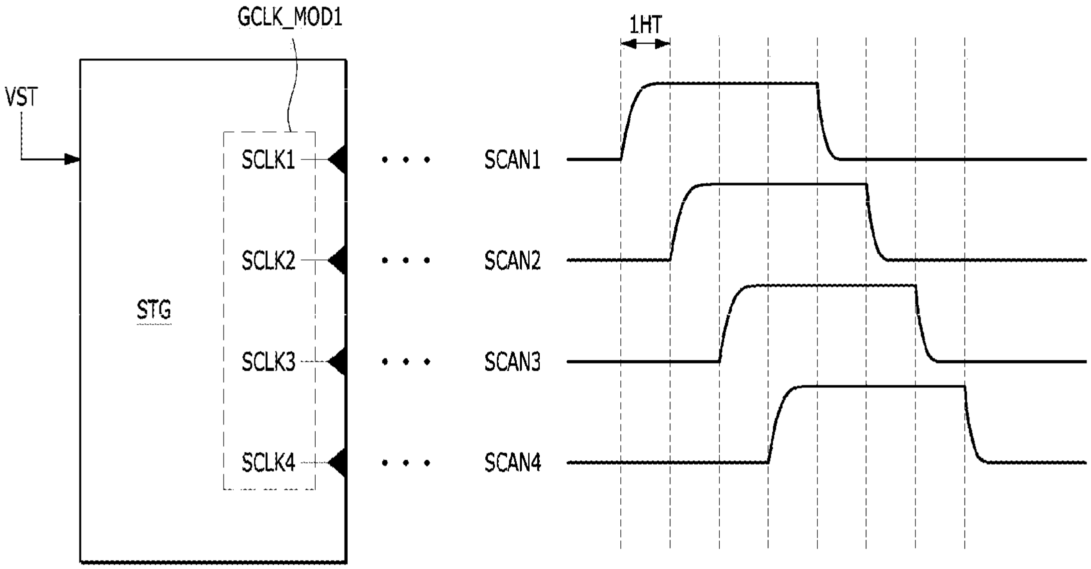

FIG. 6 is a diagram illustrating an example where a screen having a first resolution is implemented in a normal scan rate mode and a screen having a second resolution is implemented in a high scan rate mode.

Referring to FIG. 6, a screen of a first resolution UHD may be implemented in a normal scan rate mode MODE1, and a screen of a second resolution FHD may be implemented in a high scan rate mode MODE2. In the high scan rate mode MODE2, sequential scanning may be performed on two gate lines of the same gate line pair with a time difference ΔT which is far shorter than one horizontal period, and thus, each of a horizontal resolution and a vertical resolution of a screen may decrease by half compared to the normal scan rate mode.

In the normal scan rate mode MODE1, the screen of the first resolution UHD may be implemented by normal scan rate scan signals. The normal scan rate scan signals may be synchronized with first-mode gate clocks GCLK_MOD1. "DLG: OFF" may be implemented by the first-mode gate clocks GCLK_MOD1. "DLG: OFF" may denote that a resolution reduction function is deactivated. In the normal scan rate mode MODE1, input image data may be displayed on a screen without omission.

In the high scan rate mode MODE2, the screen of the second resolution FHD may be implemented by high scan rate scan signals. The high scan rate scan signals may be synchronized with second-mode gate clocks GCLK_MOD2. "DLG: ON" may be implemented by the second-mode gate clocks GCLK_MOD2. "DLG: ON" may denote that a resolution reduction function is activated. In the high scan rate mode MODE2, input image data may be displayed on a screen in a state where a portion of the input image data is omitted.

FIGS. 7 to 10 are diagrams for describing an operation of a panel driver for implementing a screen having a first resolution in a normal scan rate mode.

Referring to FIGS. 7 to 10, in a normal scan rate mode MODE1, a gate driver may respectively supply first to $m^{th}$ gate lines with first to $m^{th}$ normal scan rate scan signals SCAN1 to SCANm having a delay difference equal to one horizontal period 1HT, so as to implement a screen of a first resolution UHD.

In this case, a data driver may synchronize input image data with the first to $m^{th}$ normal scan rate scan signals SCAN1 to SCANm to output to data lines without downscaling.

That is, the data driver may output a first data voltage D1 during a first horizontal period H1 overlapping the first normal scan rate scan signal SCAN1, output a second data voltage D2 during a second horizontal period H2 overlapping the second normal scan rate scan signal SCAN2, output a third data voltage D2 during a third horizontal period H3 overlapping the third normal scan rate scan signal SCAN3, and output a fourth data voltage D4 during a fourth horizontal period H4 overlapping the fourth normal scan rate scan signal SCAN4. In this manner, the data driver may output an $m^{th}$ data voltage Dm during an $m^{th}$ horizontal period Hm overlapping the $m^{th}$ normal scan rate scan signal SCANm.

Therefore, during one vertical period (one frame period), the first to $m^{th}$ data voltages D1 to Dm may be sequentially supplied to all pixel lines of a display panel, and thus, the screen of the first resolution UHD may be finished.

In the normal scan rate mode MODE1, the first to fourth normal scan rate scan signals SCAN1 to SCAN4 may be synchronized with first-mode gate clocks GCLK_MOD1. That is, in one stage, the first-mode gate clocks GCLK_MOD1 may be output to the first to fourth normal scan rate scan signals SCAN1 to SCAN4.

Figure 10:
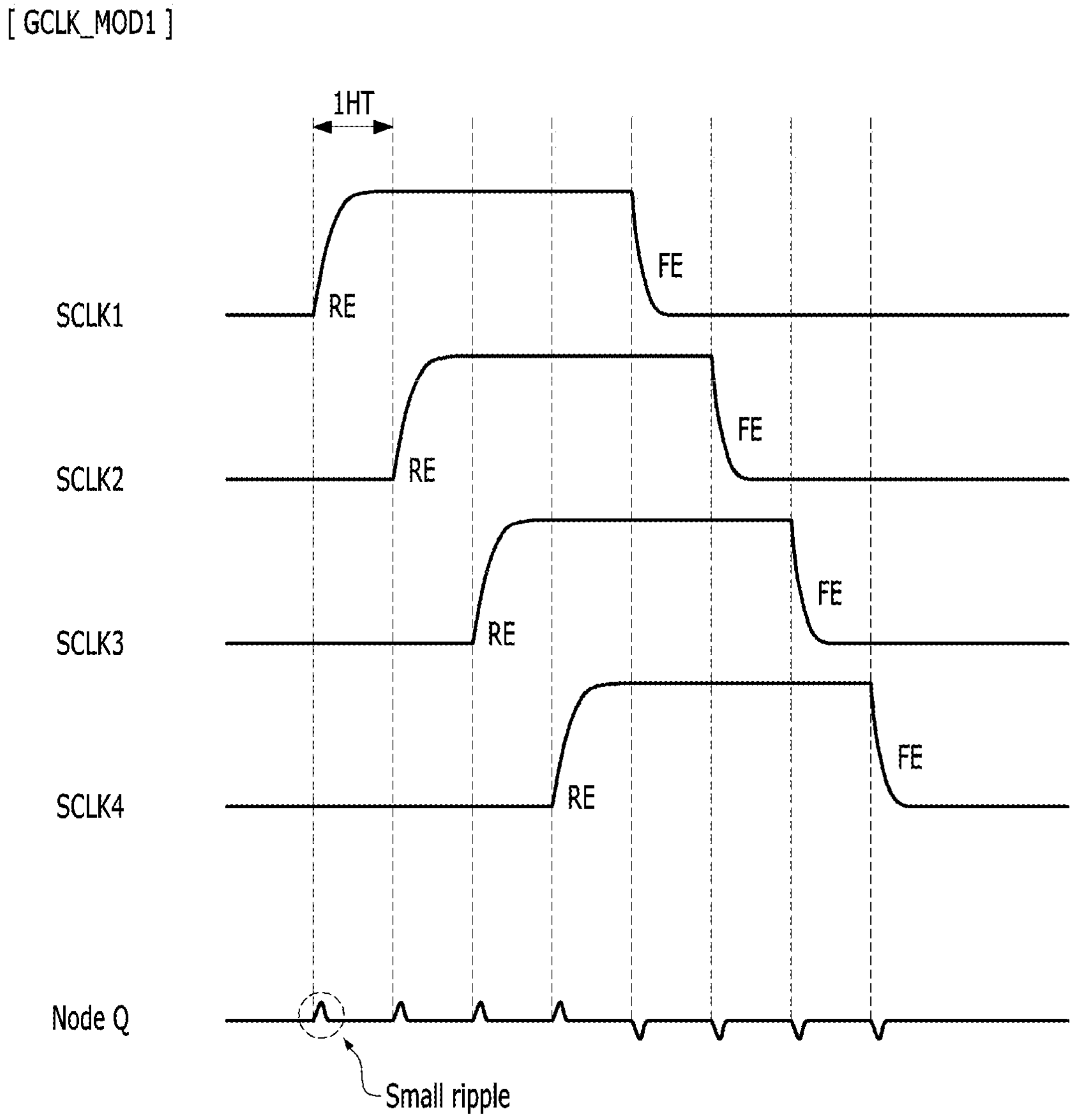

The first-mode gate clocks GCLK_MOD1, as in FIG. 10, may be implemented with the first to fourth gate clocks SCLK1 to SCLK4 having a delay difference equal to one horizontal period 1HT between adjacent gate clocks. That is, rising edges RE of the first-mode gate clocks GCLK_MOD1 may be temporally distributed with a delay difference equal to one horizontal period 1HT. Likewise, falling edges FE of the first-mode gate clocks GCLK_MOD1 may also be temporally distributed with a delay difference equal to one horizontal period 1HT. Accordingly, a magnitude of ripple occurring in a first control node (Q of FIG. 5) may be small at timings at which the rising edges RE and the falling edges FE of the first-mode gate clocks GCLK_MOD1 are synchronized with one another.

FIGS. 11 to 19 are diagrams for describing an operation of a panel driver for implementing a screen having a second resolution in a high scan rate mode.

Figure 11:
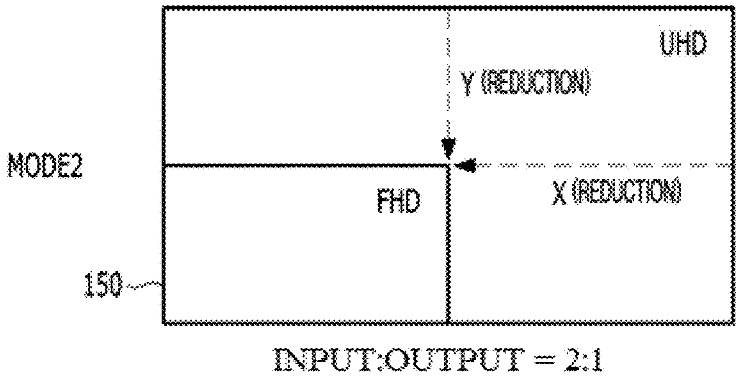
FIGS. 11 to 19 are diagrams for describing an operation of a panel driver for implementing a screen having a second resolution in a high scan rate mode.

Referring to FIG. 11, in order to implement a screen of a second resolution FHD in a high scan rate mode MODE2, a gate driver may decrease one vertical period (corresponding to a vertical resolution) by about half compared to normal, based on a second-mode gate clocks GCLK_MOD2, and a data driver may down-scale input image data to decrease a horizontal resolution by about half compared to normal.

In the high scan rate mode MODE2, a vertical resolution of a screen may decrease by y compared to normal, and a horizontal resolution of the screen may decrease by x compared to normal. Comparing with a first resolution UHD, a second resolution FHD may be about ¼ (width ½*length ½).

Figure 15:
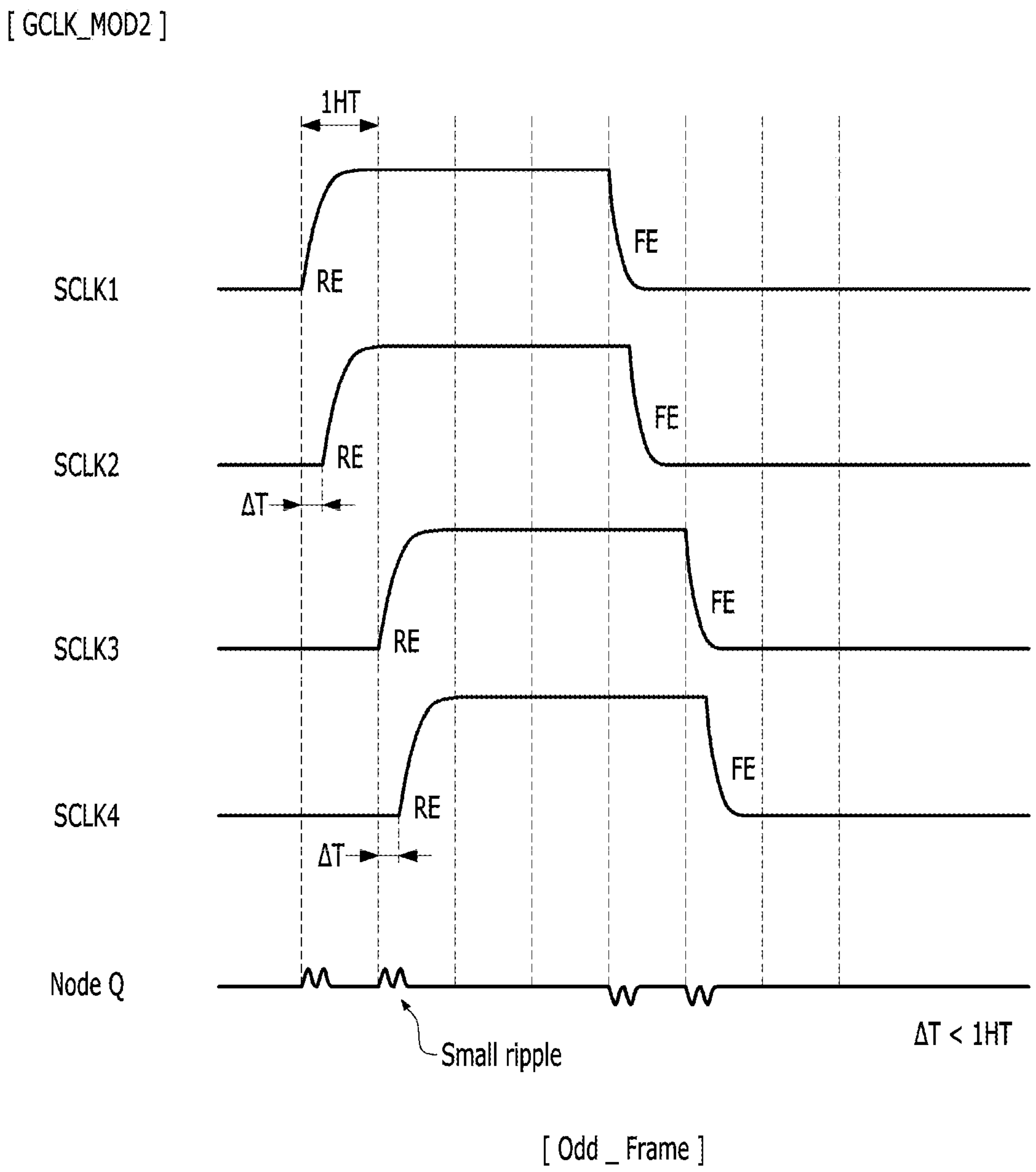
Figure 16:
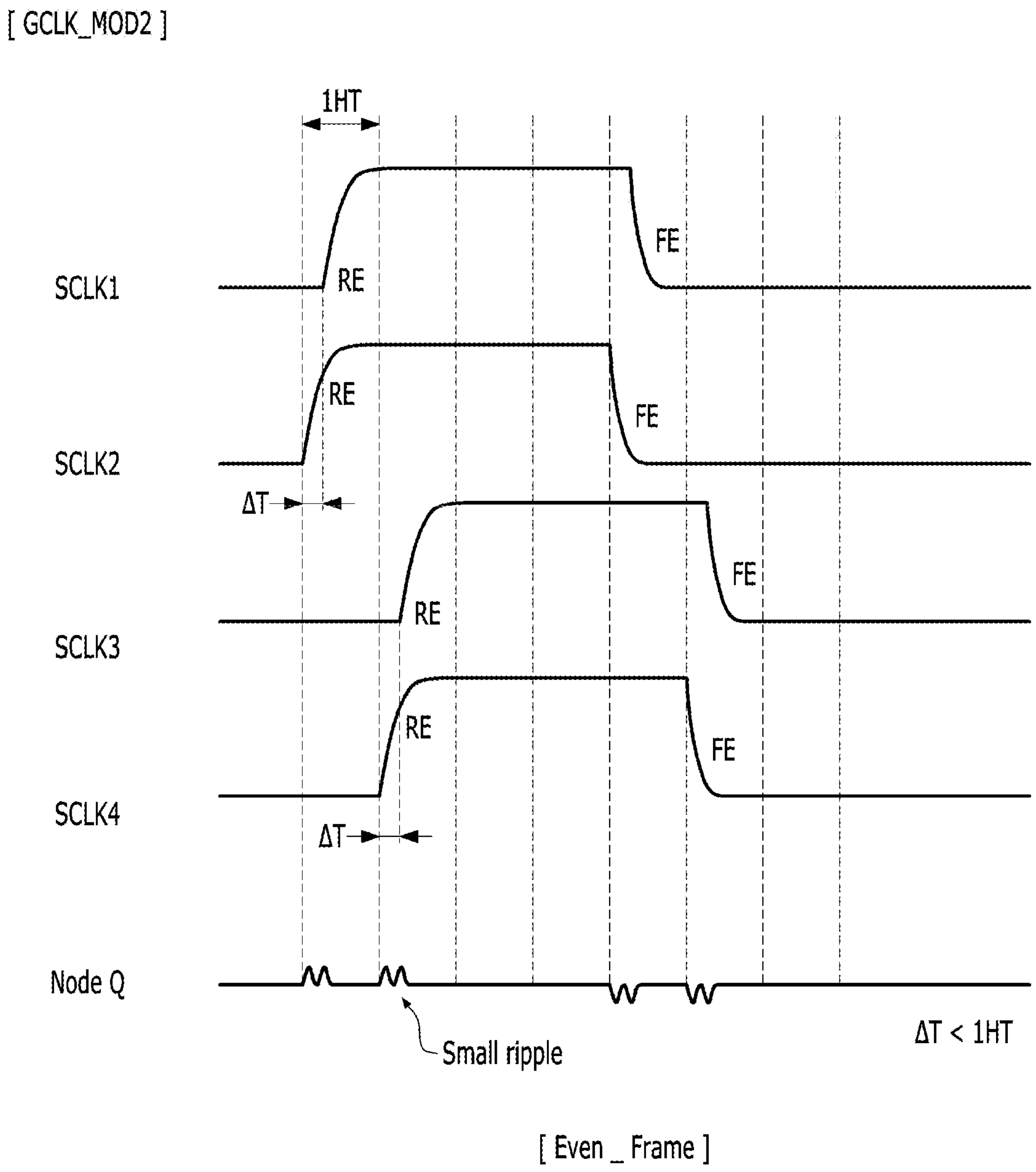
Figure 17:
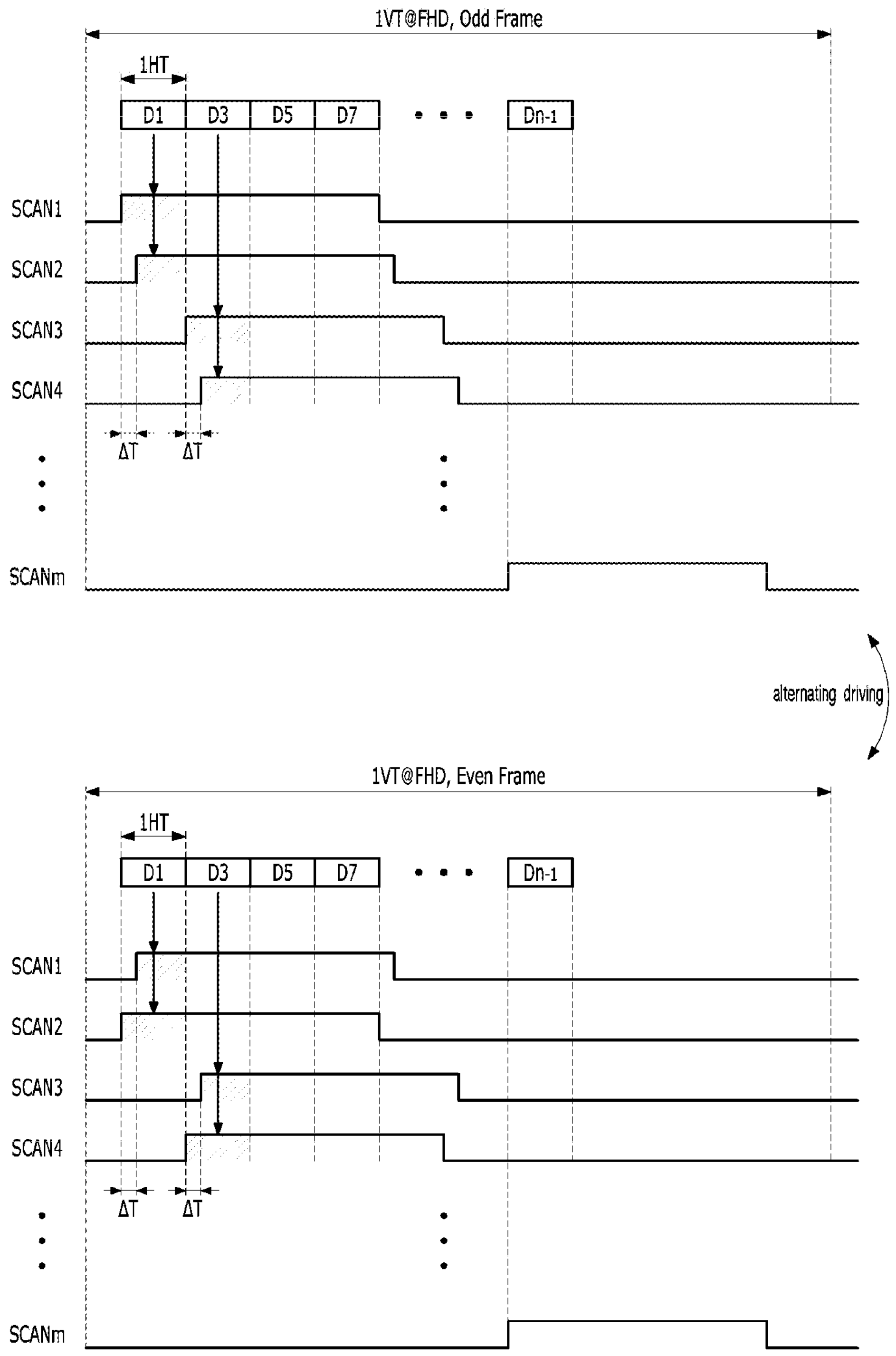

A first scan control concept and a second scan control concept may be considered for reducing one vertical period in the high scan rate mode MODE2. The first scan control concept is illustrated in FIGS. 12 to 14, and the second scan control concept is illustrated in FIGS. 15 to 17.

Figure 12:
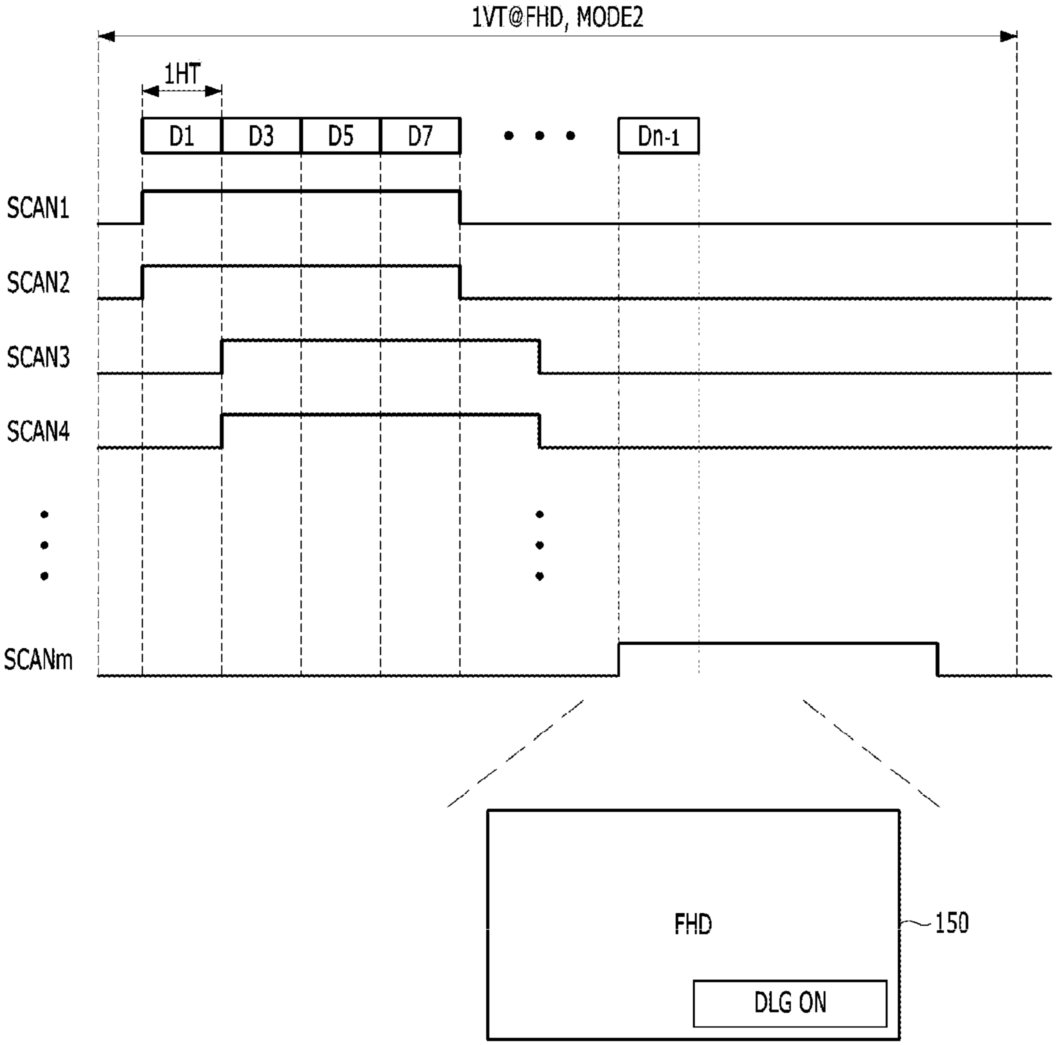
Figure 13:
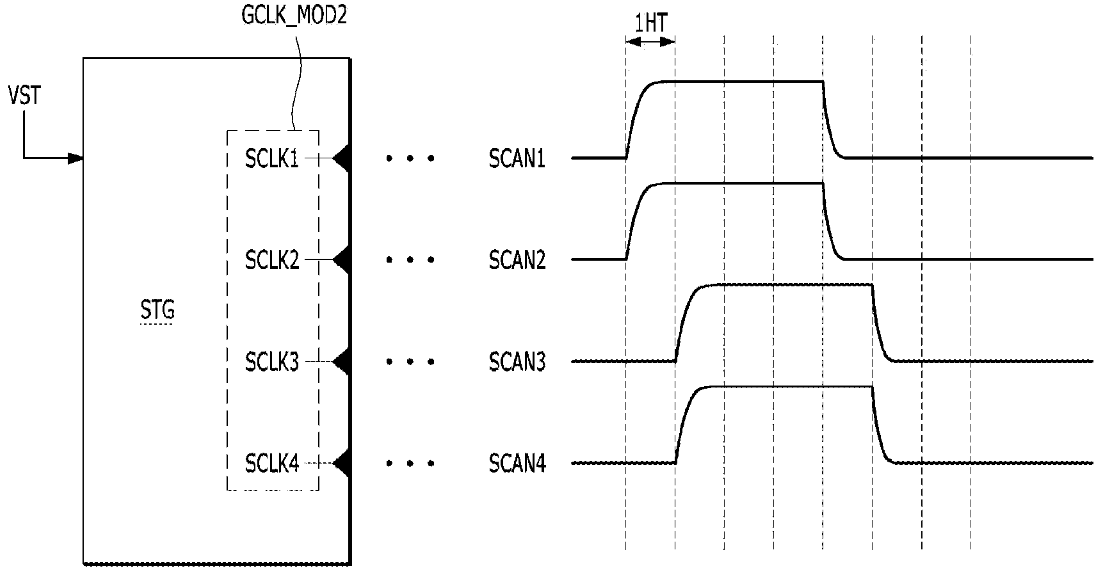
Figure 14:
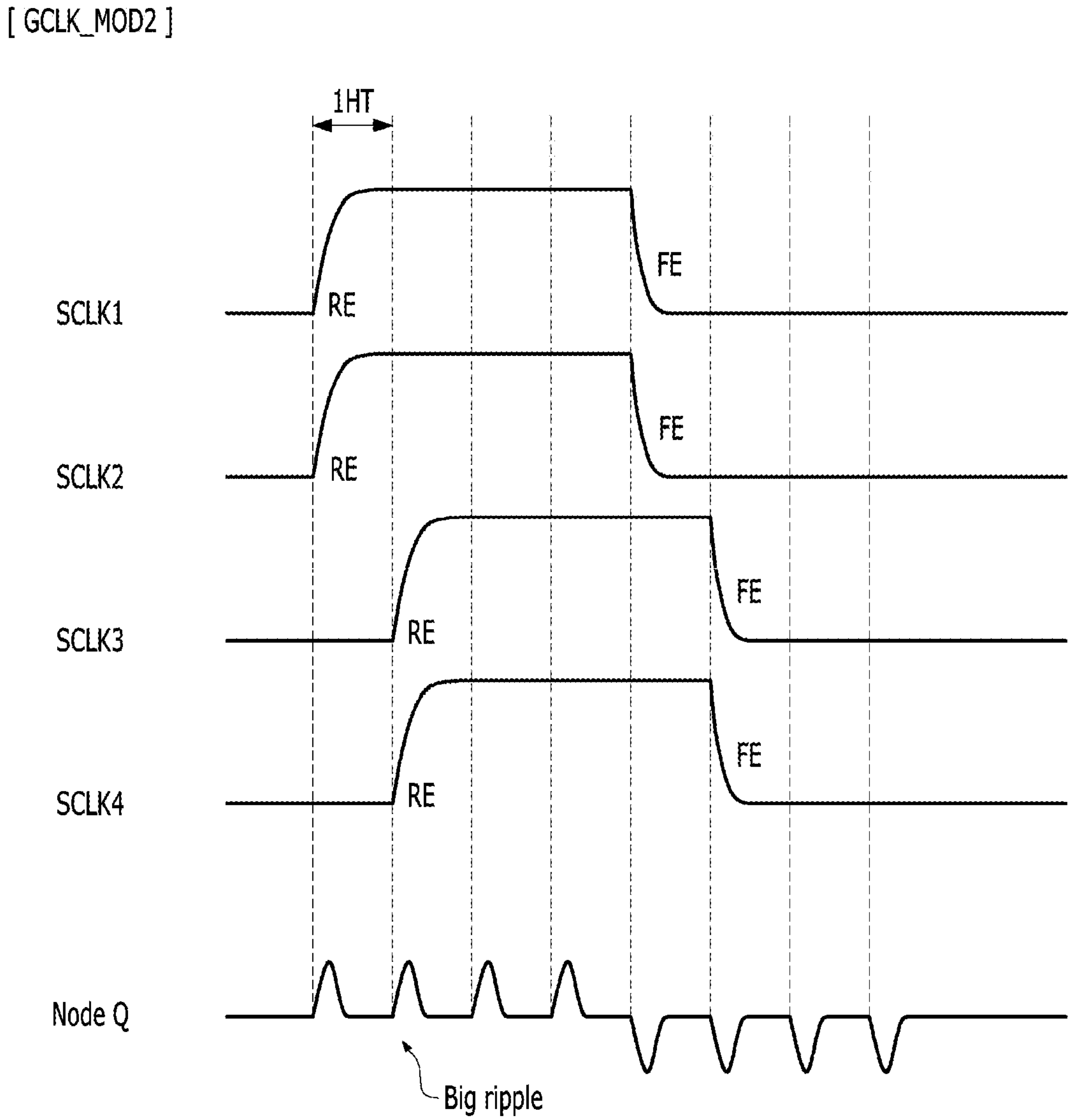

The first scan control concept, as in FIGS. 12 to 14, may configure gate line pairs each including two gate lines and may sequentially scan the gate line pairs with a delay difference equal to one horizontal period 1HT, and for example, may simultaneously scan two gate lines of the same gate line pairs. For example, first and second high scan rate scan signals SCAN1 and SCAN2 respectively supplied to first and second gate lines may be synchronized with each other, and third and fourth high scan rate scan signals SCAN3 and SCAN4 respectively supplied to third and fourth gate lines may be synchronized with each other.

The second-mode gate clocks GCLK_MOD2 may be needed for implementing the first scan control concept as in FIG. 14. The second-mode gate clocks GCLK_MOD2 may include first and second gate clocks SCLK1 and SCLK2 having the same phase and third and fourth gate clocks SCLK3 and SCLK4 having the same phase. In this case, phases of the third and fourth gate clocks SCLK3 and SCLK4 may be one horizontal period 1HT later than phases of the first and second gate clocks SCLK1 and SCLK2.

In the second-mode gate clocks GCLK_MOD2 for implementing the first scan control concept, as in FIG. 14, rising edges RE may concentrate two-by-two at the same timings, and moreover, falling edges FE may concentrate two-by-two at the same timings. Accordingly, there may be a drawback where a magnitude of ripple occurring in a first control node (Q of FIG. 5) increases at timings at which the rising edges RE and the falling edges FE of the second-mode gate clocks GCLK_MOD2 are synchronized with one another.

The second scan control concept may be for complementing the drawback of the first scan control concept.

The second scan control concept, as in FIGS. 15 to 17, may configure gate line pairs each including two gate lines and may sequentially scan the gate line pairs with a delay difference equal to one horizontal period 1HT, and for example, may sequentially scan two gate lines of the same gate line pair with a time difference ΔT which is far shorter than one horizontal period 1HT. For example, first and second high scan rate scan signals SCAN1 and SCAN2 respectively supplied to first and second gate lines may have a time difference ΔT, and third and fourth high scan rate scan signals SCAN3 and SCAN4 respectively supplied to third and fourth gate lines may have a time difference ΔT.

The second-mode gate clocks GCLK_MOD2 may be needed for implementing the second scan control concept as in FIGS. 15 and 16. The second-mode gate clocks GCLK_MOD2 may include first to fourth gate clocks SCLK1 to SCLK4 where a phase is sequentially shifted, first and third gate clocks SCLK1 and SCLK3 may have a delay difference equal to one horizontal period 1HT, first and second gate clocks SCLK1 and SCLK2 may have a delay difference equal to a time ΔT which is less than one horizontal period 1HT, and third and fourth gate clocks SCLK3 and SCLK4 may have a delay difference equal to a time ΔT which is less than one horizontal period.

In the second-mode gate clocks GCLK_MOD2 for implementing the second scan control concept, as in FIGS. 15 and 16, rising edges RE and falling edges FE may be temporally distributed, and thus, a magnitude of ripple occurring in the high scan rate mode MODE2 may decrease to a level corresponding to the normal scan rate mode MODE1.

In the high scan rate mode MODE2, a first pixel and a second pixel which are connected to the same data line and are disposed adjacent to each other may be charged with the same image data voltage. According to the first scan control concept, a charge time of the first pixel and a charge time of the second pixel may be secured to be equal to each other, but according to the second scan control concept, the charge time of the first pixel and the charge time of the second pixel may differ.

That is, in the second-mode gate clocks GCLK_MOD2 as in FIG. 15, the charge time of the second pixel may be shorter than the charge time of the first pixel as in FIG. 17. On the other hand, in the second-mode gate clocks GCLK_MOD2 as in FIG. 16, the charge time of the second pixel may be longer than the charge time of the first pixel as in FIG. 17.

To allow an image quality defect caused by a charge time deviation between adjacent pixels not to be recognized, the present embodiment may allocate the second-mode gate clocks GCLK_MOD2 shown in FIG. 15 to an odd-numbered frame and may allocate the second-mode gate clocks GCLK_MOD2 shown in FIG. 16 to an even-numbered frame. Accordingly, alternating driving may be implemented as in FIG. 17.

Referring to FIG. 15, in the second-mode gate clocks GCLK_MOD2 allocated to an odd-numbered frame of the high scan rate mode MODE2, a rising edge RE of the third gate clock SCLK3 may be one horizontal period 1HT later in phase than a rising edge RE of the first gate clock SCLK1, a rising edge RE of the second gate clock SCLK2 may be a time ΔT (which may be less than one horizontal period 1HT) later in phase than the rising edge RE of the first gate clock SCLK1, and a rising edge RE of the fourth gate clock SCLK4 may be a time ΔT (which may be less than one horizontal period 1HT) later in phase than the rising edge RE of the third gate clock SCLK3.

Referring to FIG. 16, in the second-mode gate clocks GCLK_MOD2 allocated to an even-numbered frame of the high scan rate mode MODE2, a rising edge RE of the third gate clock SCLK3 may be one horizontal period 1HT later in phase than a rising edge RE of the first gate clock SCLK1, a rising edge RE of the second gate clock SCLK2 may be a time ΔT (which may be less than one horizontal period 1HT) earlier in phase than the rising edge RE of the first gate clock SCLK1, and a rising edge RE of the fourth gate clock SCLK4 may be a time ΔT (which may be less than one horizontal period 1HT) earlier in phase than the rising edge RE of the third gate clock SCLK3. The raising edge of the third gate clock SCLK3 is delayed from those of both the second gate clock SCLK2 and the first gate clock SCLK1. The raising edge of the fourth gate clock SCLK4 is still delayed from those of both the second gate clock SCLK2 and the first gate clock SCLK1.

The descriptions about the timings of the gate clock signals also apply to the scan signals SCAN as the scan signals are synchronized with or generated based on the gate clock signals.

Figure 18:
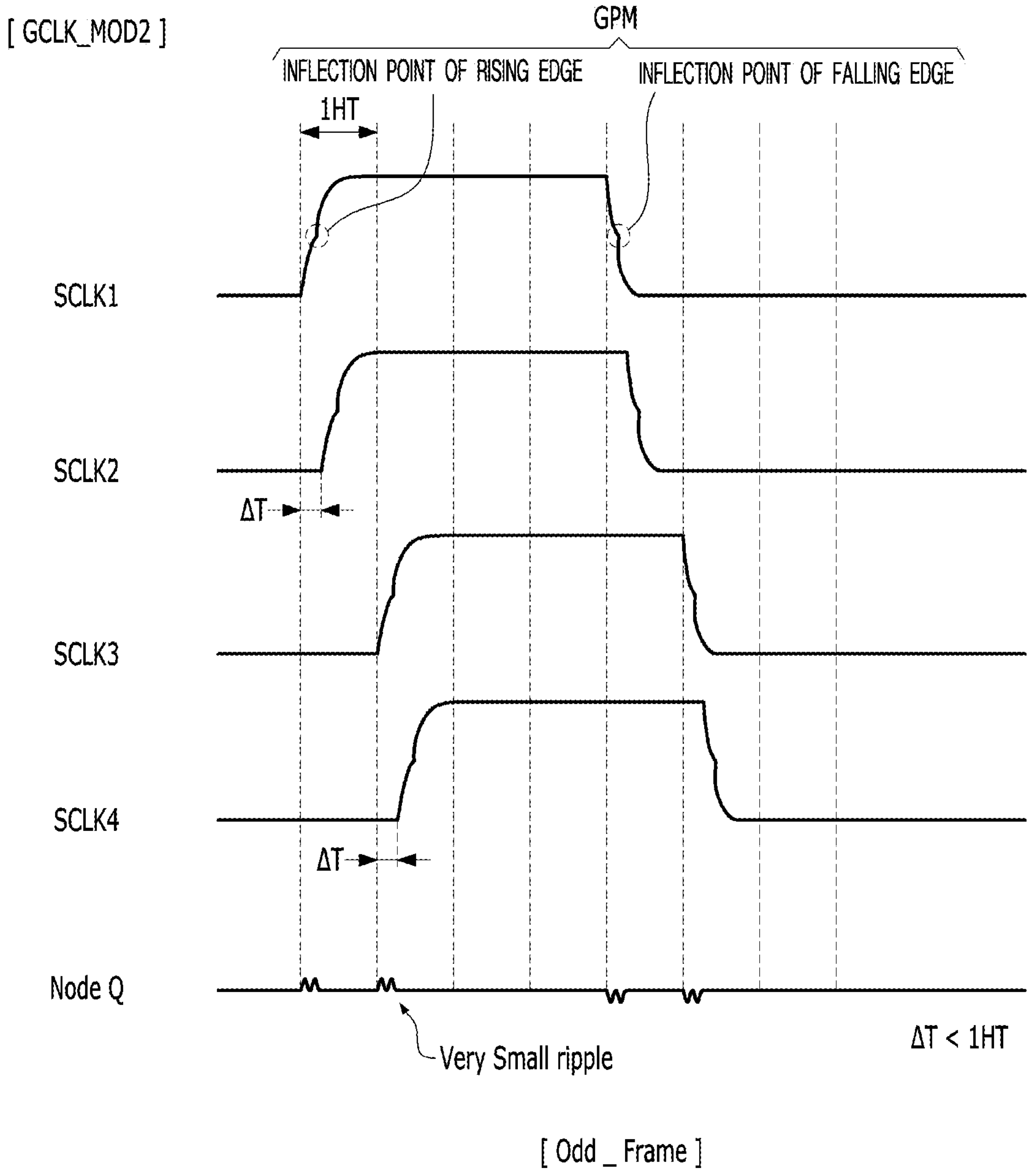
Figure 19:
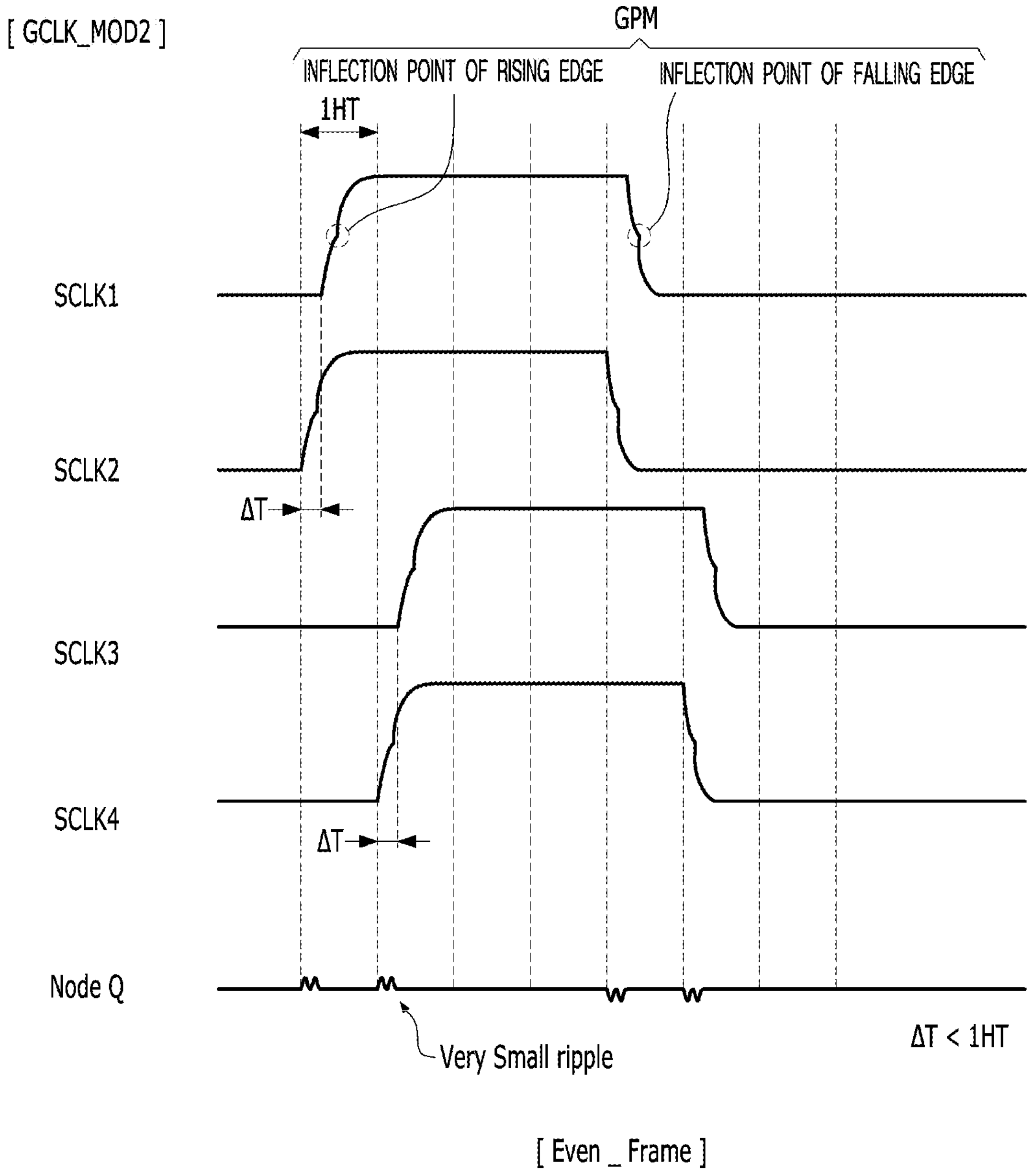

FIGS. 18 and 19 show a modification example of the second scan control concept implemented in a high scan rate mode MODE2.

Referring to FIGS. 18 and 19, each of second-mode gate clocks GCLK_MOD2 implemented in a high scan rate mode MODE2 may include at least one inflection point in a rising edge and/or a falling edge. Based on gate clock modulation, a magnitude of ripple occurring in the high scan rate mode MODE2 may decrease more to be less than or equal to a level corresponding to a normal scan rate mode MODE1.

The embodiments of FIGS. 18 and 19 may include an alternating driving scheme and effect of the second scan control concept described above with reference to FIGS. 15 to 17.

The present embodiment may decrease a magnitude of ripple, occurring in the high scan rate mode, to a level corresponding to the normal scan rate mode and may thus stabilize an operation of the gate driver and may increase image quality.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure including the following claims.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gate driver comprising:

a level shifter configured to output first-mode gate clocks in a normal scan rate mode and output second-mode gate clocks in a high scan rate mode having a scan rate greater than the normal scan rate mode; and a gate shifter register configured to output normal scan rate scan signals synchronized with the first-mode gate clocks in the normal scan rate mode and output high scan rate scan signals synchronized with the second-mode gate clocks in the high scan rate mode, wherein adjacent gate clocks of the first-mode gate clocks have a delay difference equal to one horizontal period, the second-mode gate clocks comprise first, second, third, and fourth gate clocks where a phase is sequentially shifted, and the first and third gate clocks have a delay difference equal to the one horizontal period, the first and second gate clocks have a delay difference that is less than the one horizontal period, and the third and fourth gate clocks have a delay difference that is less than the one horizontal period, and wherein, in an even-numbered frame of the high scan rate mode, a rising edge of the third gate clock is delayed in phase by the one horizontal period compared to a rising edge of the first gate clock, a rising edge of the second gate clock is ahead in phase by a time period less than the one horizontal period compared to the rising edge of the first gate clock, and a rising edge of the fourth gate clock is ahead in phase by a time period less than the one horizontal period compared to the rising edge of the third gate clock.

2. The gate driver of claim 1, wherein, in an odd-numbered frame of the high scan rate mode, a rising edge of the third gate clock is delayed in phase by the one horizontal period compared to a rising edge of the first gate clock, a rising edge of the second gate clock is delayed in phase by a time period less than the one horizontal period compared to the rising edge of the first gate clock, and a rising edge of the fourth gate clock is delayed in phase by a time period less than the one horizontal period compared to the rising edge of the third gate clock.

3. The gate driver of claim 1, wherein each of the first, second, third, and fourth gate clocks comprises at least one inflection point in a rising edge or a falling edge thereof.

4. The gate driver of claim 3, wherein, in an odd-numbered frame of the high scan rate mode, a rising edge of the third gate clock is delayed in phase by the one horizontal period compared to a rising edge of the first gate clock, a rising edge of the second gate clock is delayed in phase by a time period less than the one horizontal period compared to the rising edge of the first gate clock, and a rising edge of the fourth gate clock is delayed in phase by a time period less than the one horizontal period compared to the rising edge of the third gate clock.

5. A display device comprising:

a display panel including a plurality of pixels, a plurality of gate lines connected to the plurality of pixels, and a plurality of data lines connected to the plurality of pixels;

a gate driver configured to drive the plurality of gate lines; and a data driver configured to drive the plurality of data lines, wherein the gate driver comprises:

a level shifter configured to output first-mode gate clocks in a normal scan rate mode and output second-mode gate clocks in a high scan rate mode having a scan rate greater than the normal scan rate mode; and a gate shifter register configured to output normal scan rate scan signals synchronized with the first-mode gate clocks to the plurality of gate lines in the normal scan rate mode and output high scan rate scan signals synchronized with the second-mode gate clocks to the plurality of gate lines in the high scan rate mode, wherein adjacent gate clocks of the first-mode gate clocks have a delay difference equal to one horizontal period, the second-mode gate clocks comprise first, second, third, and fourth gate clocks where a phase is sequentially shifted, the first and third gate clocks have a delay difference equal to the one horizontal period, the first and second gate clocks have a delay difference that is less than the one horizontal period, and the third and fourth gate clocks have a delay difference that is less than the one horizontal period, and wherein, in an even-numbered frame of the high scan rate mode, a rising edge of the third gate clock is delayed in phase by the one horizontal period compared to a rising edge of the first gate clock, a rising edge of the second gate clock is ahead in phase by a time period less than the one horizontal period compared to the rising edge of the first gate clock, and a rising edge of the fourth gate clock is ahead in phase by a time period less than the one horizontal period compared to the rising edge of the third gate clock.

6. The display device of claim 5, wherein, in an odd-numbered frame of the high scan rate mode, a rising edge of the third gate clock is delayed in phase by the one horizontal period compared to a rising edge of the first gate clock, a rising edge of the second gate clock is delayed in phase by a time period less than the one horizontal period compared to the rising edge of the first gate clock, and a rising edge of the fourth gate clock is delayed in phase by a time period less than the one horizontal period compared to the rising edge of the third gate clock.

7. The display device of claim 5, wherein each of the first, second, third, and fourth gate clocks comprises at least one inflection point in a rising edge or a falling edge thereof.

8. The display device of claim 7, wherein, in an odd-numbered frame of the high scan rate mode, a rising edge of the third gate clock is delayed in phase by the one horizontal period compared to a rising edge of the first gate clock, a rising edge of the second gate clock is delayed in phase by a time period less than the one horizontal period compared to the rising edge of the first gate clock, and a rising edge of the fourth gate clock is delayed in phase by a time period less than the one horizontal period compared to the rising edge of the third gate clock.

9. The display device of claim 5, wherein, in the normal scan rate mode, the data driver is configured to synchronize an image data voltage having a first resolution with the normal scan rate scan signals to output to the plurality of data lines, and in the high scan rate mode, the data driver is configured to synchronize an image data voltage having a second resolution which is less than the first resolution with the high scan rate scan signals to output to the plurality of data lines.

10. The display device of claim 9, wherein, in the high scan rate mode, a first pixel and a second pixel which are connected to a same data line and are disposed adjacent to each other are charged with a same image data voltage.

11. The display device of claim 10, wherein, in an odd-numbered frame of the high scan rate mode, a data charge time of the first pixel is longer than a data charge time of the second pixel, and in an even-numbered frame of the high scan rate mode, a data charge time of the first pixel is shorter than a data charge time of the second pixel.

12. A gate driver comprising:

a level shifter configured to output first-mode gate clocks in a normal scan rate mode and output second-mode gate clocks in a high scan rate mode having a scan rate greater than the normal scan rate mode; and a gate shifter register configured to output normal scan rate scan signals synchronized with the first-mode gate clocks in the normal scan rate mode and output high scan rate scan signals synchronized with the second-mode gate clocks in the high scan rate mode, wherein the gate shifter register includes a plurality of stages, a stage of the plurality of stages including a plurality of output circuits, the plurality of output circuits including a first output circuit, a second output circuit, a third output circuit, and a fourth output circuit configured to output a first scan signal, a second scan signal, a third scan signal, and a fourth scan signal, respectively, wherein in the normal frame of a first scan rate mode the second scan signal is later than the first scan signal by a first delay time, and in a second frame subsequent to the first frame in the first-normal scan rate mode, the second scan signal is earlier than the first scan signal, and wherein in an even-numbered frame of the high scan rate mode, a rising edge of the third scan signal is delayed in phase by the first delay time compared to a rising edge of the first scan signal, a rising edge of the second scan signal is ahead in phase by a time period less than the first delay time compared to the rising edge of the first scan signal, and a rising edge of the fourth scan signal is ahead in phase by a time period less than the first delay time compared to the rising edge of the third scan signal.

13. The gate driver of claim 12, wherein the first output circuit and the second output circuit share a same Q node and a same QB node.

14. The gate driver of claim 13, wherein:

the first output circuit includes a first pull-up transistor and a first pull-down transistor;

the second output circuit includes a second pull-up transistor and a second pull-down transistor;

a gate of the first pull-up transistor and a gate of the second pull-up transistor are connected to the Q node; and a gate of the first pull-down transistor and a gate of the second pull-down transistor are connected to the QB node.

15. The gate driver of claim 12, wherein in the first frame of the normal scan rate mode, the third scan signal is later than the second scan signal and the fourth scan signal is later than the third scan signal; and wherein in the second frame subsequent to the normal frame in the first scan rate mode, the third scan signal is later than both the first scan signal and the second scan signal, and the fourth scan signal is earlier than the third scan signal.

* * * * *